March 6, 1928. 1,661,303

H. G. PRICE ET AL

ELECTRODE RACK

Filed Feb. 24, 1927

INVENTORS
Herman G. Price
Benjamin K. Smith
BY
Hardway Cartuy
ATTORNEYS.

Patented Mar. 6, 1928.

1,661,303

UNITED STATES PATENT OFFICE.

HERMAN G. PRICE AND BENJAMIN K. SMITH, OF HOUSTON, TEXAS.

ELECTRODE RACK.

Application filed February 24, 1927. Serial No. 170,714.

This invention relates to new and useful improvements in a rack.

One object of the invention is to provide a device of the character described specially designed for the purpose of holding electrodes used in electric welding.

In welding with an electric machine an electrode is used which consists of a long metal rod of the required size. This rod is held by the welding machine and one end of it is applied to and fused, or welded into the work as the work progresses. As at present used only about three-fourths of the electrode is utilized and the remaining one-fourth, or stub, remaining in the machine is taken out and thrown away and another electrode substituted for it. It is the object of this invention to provide an electrode rack wherein a supply of electrodes will be held in such position that when it becomes necessary to supply a new electrode to the welding machine that the new electrode may be quickly and easily fused to the end of the electrode stub remaining in the machine so that said stub, or part, of the partly consumed electrode used need not be wasted thus resulting in a great saving of electrode material as well as a great saving in time in supplying new electrodes to the welding machine, as needed.

With the above and other objects in view the invention has particular relation to certain novel features of construction, arrangement of parts and use, an example of which is given in this specification and illustrated in the accompanying drawings wherein.

Figure 2:
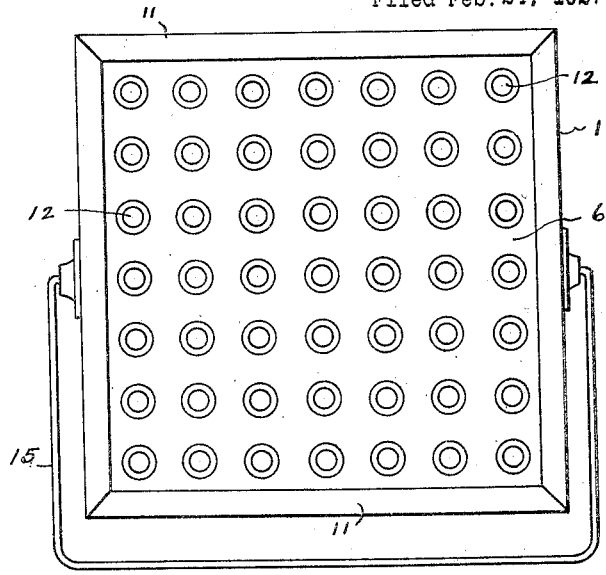
Figure 2 shows a plan view thereof.
Figure 1:
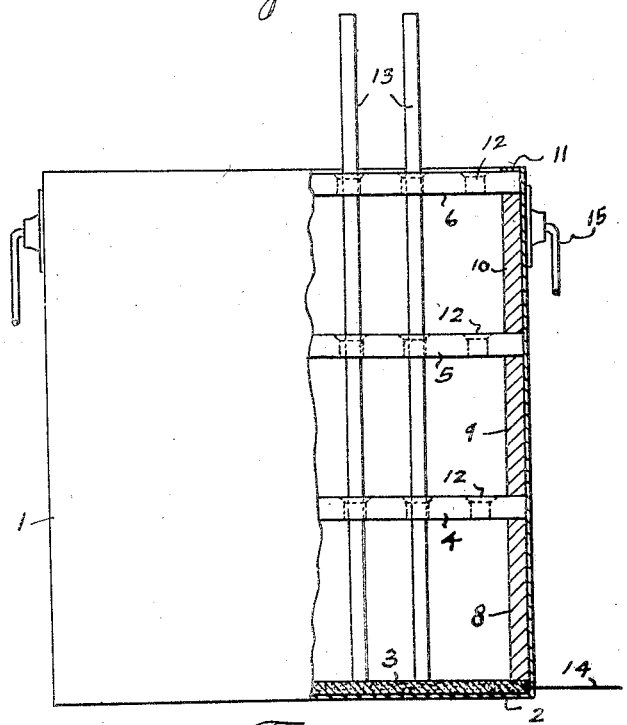
Figure 1 shows a side elevation of the rack, partly in section.

Referring now more particularly to the drawings, wherein like numerals of reference designate similar parts in each of the figures, the numeral 1 designates a box-like casing preferably square in cross section, which has the bottom 2 and which is open at the top. This casing is preferably made of sheet metal, for durability but may be made of other suitable material. On the bottom 2 there is a plate 3 formed of non-fusible material which is, at the same time, a good electrical conductor and is preferably composed of carbon. There are the lower, intermediate and upper blocks, or rack members 4, 5, and 6, spaced apart and fitted closely within the casing 1 and preferably formed of wood or other nonconducting material. These respective rack members are supported on the lower, intermediate and upper spacer frames 8, 9, and 10, which are formed to fit closely within the casing 1 and are composed of wood, or other suitable non-conducting material, each spacer frame supporting the adjacent rack member above it and the upper margin of each side of the casing is over turned against the upper side of the block 6 forming the retaining flanges 11 whose adjacent ends are welded together. The insulating blocks 4, 5, and 6 have the vertically aligned openings 12, as shown, whose upper ends are preferably flared and the electrodes 13 may be inserted through the openings 12 with their lower ends resting on the carbon plate 3 and thus stored for use.

If desired a single block may be secured in the casing 1 to take the place of the plurality of blocks 4, 5, and 6. In case a single block is used it would of course have the required thickness to properly support the electrodes in upright position.

When an electric welding machine is being operated the electrode of the machine constitutes the negative pole and the work constitutes the positive pole of an electrical circuit.

When it is desired to insert a new electrode in the machine the rack should be placed on the work so that the bottom plate 2 of the casing will contact with the positive pole, said plate 2 being of suitable conducting material, or if the bottom 2 is not of conducting material the carbon plate 3 should be directly connected with the positive pole by any suitable electrical conductor as 14. The free end of the stub, or unused portion of the electrode in the machine is then brought into contact with the upper end of one of the electrodes 13 and said electrode will be immediately welded to said stub and may be then withdrawn from the rack. The carbon plate 3 is used as a support for the lower end of the electrodes so that when an electrode is welded to the unused portion of the electrode in the machine it will not become welded to said supporting plate 3.

A suitable bail 15 is provided for the convenient handling of the rack.

While the plate 3 has been hereinbefore described as being formed of non-fusible material it is to be understood that the term "non-fusible" is used in the sense that the plate 3 will not fuse or unite with the electrodes as the same are welded or fused to the stub remaining in the machine.

What we claim is:

1. An electrode rack including a casing, an electrode support therein formed of non-fusible material, said support being also an electrical conductor, means for electrically connecting the support with the work and means in the casing for retaining the electrodes on said support, in spaced relation.

2. An electrode rack including a casing, an electrode support therein formed of non-fusible material, said support being also an electrical conductor, means for electrically connecting the support with the work, and means in the casing for retaining the electrodes on said support in spaced relation, said retaining means being of non-conducting material.

3. An electrode rack including a casing formed of conducting material, an electrode support therein formed of carbon, means in the casing above the support for maintaining electrodes, supported by said support, in spaced relation.

4. An electrode rack including a casing, spacing means within the casing for maintaining electrodes in spaced relation, said spacing means being formed of non-conducting material and means formed of non-fusible electrical conducting material associated with the casing and adapted to contact with the electrodes in said rack and means for electrically connecting said non-fusible means with the work.

5. An electrode rack including means composed of nonconducting material for maintaining electrodes in spaced relation, means composed of nonfusible, electrical conducting material adapted to contact with the electrodes in said rack and means for electrically connecting the nonfusible means with the work.

6. A rack including a casing whose bottom is formed of electrical conducting material, an electrode support on said bottom formed of carbon, means for electrically connecting said carbon with the work, means within the casing above said support formed of nonconducting material and having openings to receive electrodes and adapted to maintain the electrodes resting on said support in spaced relation.

7. An electrode rack including means composed of nonconducting material for maintaining electrodes in spaced relation and means associated with said maintaining means and adapted to contact with the electrodes in said rack, said contacting means being composed of material which will not fuse, or unite with the electrodes and which at the same time has electrical conducting properties and means for electrically connecting said nonfusible means with the work.

In testimony whereof we have signed our names to this specification.

HERMAN G. PRICE.
BENJAMIN K. SMITH.